(12) United States Patent
Kuckelkorn et al.

(10) Patent No.: US 9,939,176 B2
(45) Date of Patent: Apr. 10, 2018

(54) ABSORBER PIPE

(75) Inventors: Thomas Kuckelkorn, Jena (DE); Marc Moellenhoff, Waldsassen (DE); Christina Albers, Weiden (DE); Paul Eichel, Mitterteich (DE)

(73) Assignee: RIOGLASS SOLAR HOLDING, S.A., Asturias (ES)

( * ) Notice: Subject to any disclaimer, the term of this patent is extended or adjusted under 35 U.S.C. 154(b) by 1246 days.

(21) Appl. No.: 13/499,153

(22) PCT Filed: Sep. 29, 2010

(86) PCT No.: PCT/EP2010/064498
§ 371 (c)(1),
(2), (4) Date: Mar. 29, 2012

(87) PCT Pub. No.: WO2011/039281
PCT Pub. Date: Apr. 7, 2011

(65) Prior Publication Data
US 2012/0186576 A1    Jul. 26, 2012

(30) Foreign Application Priority Data

Sep. 29, 2009  (DE) .................. 10 2009 045 100

(51) Int. Cl.
*F24J 2/18*  (2006.01)
*F24J 2/05*  (2006.01)
(Continued)

(52) U.S. Cl.
CPC ............ *F24J 2/055* (2013.01); *F24J 2/14* (2013.01); *F24J 2/18* (2013.01); *F24J 2/4612* (2013.01);
(Continued)

(58) Field of Classification Search
CPC .. F24J 2/05; F24J 2/14; F24J 2/18; F24J 2/46
(Continued)

(56) References Cited

U.S. PATENT DOCUMENTS 4,134,388 A * 1/1979 Kersten .................... F24J 2/055
126/655
4,273,104 A * 6/1981 Uroshevich .............. F24J 2/055
126/652
(Continued)

FOREIGN PATENT DOCUMENTS

CN    1720419 A    1/2006
CN    1862143 A    11/2006
(Continued)

OTHER PUBLICATIONS

DE 102005022183 B3 Machine Translation; Accessed by Examiner on Oct. 22, 2015 http://worldwide.espacenet.com/publicationDetails/description?CC=DE&NR=102005022183B3&KC=B3&FT=D&ND=3&date=20060803&DB=EPODOC&locale=en_EP.*
(Continued)

*Primary Examiner* — Gregory Huson
*Assistant Examiner* — Nikhil Mashruwala
(74) *Attorney, Agent, or Firm* — Ohlandt, Greeley, Ruggiero & Perle, L.L.P.

(57) ABSTRACT

An absorber pipe for solar collectors is provided. The absorber pipe includes a metal pipe for and a cladding pipe surrounding the metal pipe to form an annular space that can be evacuated. The absorber pipe can include a wall extending between the cladding pipe and the metal pipe for sealing the annular space and a retaining device for a getter material or a container filled with getter material or inert gas. The retaining device has a receiving section for receiving the getter material or the container. The retaining device is fastened to the wall. The absorber pipe can alternately include a getter material disposed in the annular space for binding free hydrogen present in the annular space and a reflector disposed in the annular space for reflecting radiation. The reflector has a housing with a support section for (Continued)

fastening and protecting the getter material from the radiation.

26 Claims, 10 Drawing Sheets

(51) Int. Cl.
*F24J 2/14* (2006.01)
*F24J 2/46* (2006.01)

(52) U.S. Cl.
CPC .......... *F24J 2/4616* (2013.01); *F24J 2/4636* (2013.01); *F24J 2002/4681* (2013.01); *Y02E 10/44* (2013.01); *Y02E 10/45* (2013.01)

(58) Field of Classification Search
USPC ................ 126/651, 655, 653, 570; 165/172
See application file for complete search history.

(56) References Cited

U.S. PATENT DOCUMENTS

| | | | | |
|---|---|---|---|---|
| 4,432,345 | A * | 2/1984 | McIntire | F24J 2/07 126/694 |
| 7,552,726 | B2 * | 6/2009 | Kuckelkorn | F24J 2/055 126/651 |
| 9,404,674 | B2 * | 8/2016 | Kuckelkorn | F24J 2/055 |
| 9,423,154 | B1 * | 8/2016 | Velasco | F24J 2/05 |
| 2004/0134484 | A1 * | 7/2004 | Barkai | F24J 2/055 126/653 |
| 2005/0062415 | A1 * | 3/2005 | Yonezawa | H01J 9/385 313/553 |
| 2007/0034204 | A1 * | 2/2007 | Kuckelkorn | F24J 2/055 126/570 |
| 2007/0235024 | A1 * | 10/2007 | Kuckelkorn | F24J 2/055 126/654 |
| 2010/0126499 | A1 * | 5/2010 | Lu | F24J 2/055 126/651 |
| 2010/0313875 | A1 * | 12/2010 | Kennedy | F24J 2/055 126/652 |
| 2012/0048260 | A1 * | 3/2012 | Barkai | F24J 2/4612 126/653 |
| 2012/0186576 | A1 * | 7/2012 | Kuckelkorn | F24J 2/055 126/653 |
| 2012/0247456 | A1 * | 10/2012 | Martínez Sanz | F24J 2/055 126/653 |
| 2013/0228166 | A1 * | 9/2013 | Kuckelkorn | F24J 2/055 126/653 |
| 2014/0109894 | A1 * | 4/2014 | Palmieri | F24J 2/4616 126/653 |
| 2014/0158113 | A1 * | 6/2014 | Urbano | F24J 2/055 126/653 |
| 2014/0345600 | A1 * | 11/2014 | Mollenhoff | F24J 2/055 126/651 |
| 2014/0360488 | A1 * | 12/2014 | Brancaleoni | F24J 2/07 126/653 |
| 2015/0168016 | A1 * | 6/2015 | Benz | F24J 2/055 126/652 |
| 2016/0102888 | A1 * | 4/2016 | Kuckelkorn | F24J 2/055 126/652 |

FOREIGN PATENT DOCUMENTS

| | | | |
|---|---|---|---|
| CN | 101236021 | 8/2008 | |
| CN | 101270923 | 9/2008 | |
| CN | 201191088 | 2/2009 | |
| CN | 201203279 | 3/2009 | |
| DE | 19647567 A1 * | 5/1998 | .............. F24J 2/407 |
| DE | 19840181 | 3/2000 | |
| DE | 10231467 | 2/2004 | |
| DE | 102005022183 | 8/2006 | |
| DE | 102005022183 B3 * | 8/2006 | .............. F24J 2/055 |
| DE | 102005057276 | 7/2007 | |
| DE | 60223711 | 10/2008 | |
| EP | 0885653 | 12/1998 | |
| ES | 235960 A1 * | 12/1957 | |
| ES | 2359560 A1 * | 5/2011 | .............. F24J 2/055 |
| WO | 2004/063640 | 7/2004 | |
| WO | WO 2010128135 A2 * | 11/2010 | ............. F24J 2/4612 |
| WO | WO 2011042580 A1 * | 4/2011 | .............. F24J 2/055 |

OTHER PUBLICATIONS

DE 102005022183 B3 Machine Translation; Accessed by Examiner on Oct. 14, 2016; http://translationportal.epo.org/emtp/translate/?ACTION=description-retrieval&COUNTRY=DE&ENGINE=google&FORMAT=docdb&KIND=B3&LOCALE=en_EP&NIMBER=102005022183&OPS=ops.epo.org/3.1&SRCLANG=de&TRGLANG=en.*
DE 102005022183 B3 Machine Translation; Accessed by Examiner on Oct. 14, 2016; http://translationportal.epo.org/emtp/translate/?ACTION=description-retrieval&COUNTRY=DE&ENGINE=google&FORMAT=docdb&KIND=B3&LOCALE=en_EP&NUMBER=102005022183&OPS=ops.epo.org/3.1&SRCLANG=de&TRGLANG=en.*
English translation of the International Search Report dated Jan. 25, 2012 corresponding to International Patent No. PCT/EP2010/064498, 3 pages.
English translation of Written Opinion of the International Searching Authority dated Jan. 25, 2012 corresponding to Patent Application No. PCT/EP2010/064498, 8 pages.
English translation of International Preliminary Report on Patentability dated Apr. 3, 2012 corresponding to Patent Application No. PCT/EP2010/064498, 9 pages.
International Search Report dated Jan. 25, 2012 corresponding to International Patent Application No. PCT/EP2010/064498.

* cited by examiner

ABSORBER PIPE

CROSS REFERENCE TO RELATED APPLICATIONS

This application is a U.S. National Stage Entry under 35 U.S.C. § 371 of PCT/EP2010/064498, filed on Sep. 29, 2010, which claims the benefit of German Application No. 10 2009 045 100.5, filed on Sep. 29, 2009.

BACKGROUND OF THE INVENTION

1. Field of the Invention

The present invention relates to an absorber pipe, in particular for solar collectors in solar thermal power plants, having at least one collector mirror, comprising a metal pipe for conducting and heating a heat transfer medium; a cladding pipe surrounding the metal pipe for forming an annular space that can be evacuated; a wall extending between the cladding pipe and the metal pipe for sealing the annular space; and a retaining device for a getter material or a container filled with getter material and/or protective gas, having a receiving section for receiving the getter material or the container. In addition, the invention relates to an absorber pipe, in particular for solar collectors in solar thermal power plants, having at least one collector mirror, comprising a metal pipe for conducting and heating a heat transfer medium; a cladding pipe surrounding the metal pipe for forming an annular space that can be evacuated; and a getter material disposed in the annular space for binding free hydrogen present in the annular space.

2. Description of Related Art

Solar collectors, for example, can be equipped with a parabolic mirror, also called a collector mirror, and are used in so-called parabolic trough power plants. In known parabolic trough power plants, for example, a thermal oil that can be heated up to approximately 400° C. by means of solar rays reflected from the parabolic mirrors and focused onto the absorber pipe is used as the heat transfer medium. The absorber pipe is thus usually composed of a metal pipe, which has a radiation-absorbing layer and a cladding pipe typically made of glass, which surrounds the metal tube. The heated heat transfer medium is conducted through the metal pipe and, for example, is introduced into a device for producing steam, by which the heat energy is converted into electrical energy in a thermal process. The metal pipe and the cladding pipe run parallel and concentrically to one another. An annular space, which is sealed axially by a wall that is usually composed of metal, is formed between the metal pipe and the cladding pipe. The individual absorber pipes are welded together approximately at 4 m or longer lengths and are formed into solar field loops with a total length of up to 800 m. Absorber pipes of this type are known, for example, from DE 102 31 467 B4.

Commonly used heat transfer media, and thermal oils in particular, with increasing aging, release hydrogen, which is dissolved, for example, in the thermal oil. The quantity of dissolved hydrogen depends on the thermal oil used and on the operating conditions of the oil circuit.

The decomposition rate and thus the formation rate of hydrogen increases with increasing temperature. The decomposition of the thermal oil can be accelerated additionally by contaminants, for example by water, which gains access to the oil circuit by leakages in the heat exchanger. As a consequence of permeation through the metal pipe, the hydrogen being released gains access to the evacuated annular space, the permeation rate through the metal pipe also increasing with increasing operating temperature of the metal pipe. As a consequence of this, the pressure in the annular space also increases, which has as a consequence an increase in heat conduction through the annular space, which in turn leads to heat losses and to a lower efficiency of the absorber pipe or the solar collector. As a final effect, the service life of the absorber pipe is reduced, since after a certain time, a sufficient heat output can no longer be generated in order to be able to effectively conduct the thermal process.

In order to at least reduce the pressure increase in the annular space and thus to prolong the service life of the absorber pipe, the free hydrogen that has entered the annular space can be bound by getter materials. The absorption capacity of the getter materials is limited, however. After reaching the maximum loading capacity or after saturation of the getter material, the pressure increases in the total annular gap, dependent on the hydrogen partial pressure of the gas phase, until it is in equilibrium with the partial pressure of the free hydrogen that has dissolved out of the thermal oil. Previously, equilibrium pressures of several millibars (mbars) could be detected by means of field measurements. Due to the free hydrogen, increased heat conduction arises in the annular gap with the above-named disadvantageous consequences for the efficiency of the solar collector.

Absorber pipes, which are provided with getter materials in the annular space, are known, for example, from WO 2004/063640 A1. A retaining device for getter material, in which the getter material is stored in a trough-shaped track or loop, is described herein. The loop is attached via feet to the metal pipe. The feet are welded to the metal pipe, so that leakage can readily occur here, whereupon the heat transfer medium can enter the annular space and the vacuum in the annular space can be lost. In addition, it is a disadvantage in this retaining device that the strong temperature differences occurring during operation between the metal pipe and the carrier device and thus different length expansions must be considered, in order to prevent a buckling or a tearing off of the loop, which requires an increased expenditure for construction.

Further, the loop is found in a region that can be subject to direct solar radiation. In particular, rays that come from the mirror and miss or only brush against the metal pipe (defocused radiation) can lead to a heating of the loop and thus of the getter material. This is disadvantageous because the absorption capacity of the getter material for free hydrogen decreases with increasing temperature of the getter material, so that hydrogen that is already bound to the getter material is again released, whereby the pressure in the annular space and thus the heat conduction through the annular space again increase. Since the loop is joined via the feet directly to the metal pipe, a heat transfer, in particular a conductive heat transport, to the getter material occurs over it, which contributes to its heating.

As already mentioned initially, absorber pipes of this kind usually have walls with which the annular space is sealed. For this purpose, they extend between the metal pipe and the cladding pipe. Since the metal pipe and the cladding pipe are composed of different materials and are heated very differently during operation of the absorber pipe, they expand very differently, particularly in the axial direction. The wall comprises an expansion-equilibrating unit, with which the different thermal expansions can be equilibrated. Expansion-equilibrating units are manufactured at least partially of metal, so that they are impermeable to solar radiation. Consequently, the heat transfer medium in the region that is surrounded by expansion-equilibrating units is not heated, so that the efficiency of the absorber pipe deteriorates, the larger the region surrounded by expansion-equilibrating units.

On the other hand, the getter material can be advantageously disposed in the expansion-equilibrating units. Since, as described above, they are impermeable to solar radiation, the solar rays cannot reach the getter material or at least reach it only to a reduced extent and correspondingly do not heat it or heat it less strongly. Consequently, the absorption capacity of the getter material for free hydrogen is not reduced by solar radiation or at least is reduced less strongly in comparison to direct irradiation. A corresponding arrangement of the getter material is known from DE 10 2005 022 183 B3.

In order to increase the efficiency of the absorber pipe, however, one attempts to design expansion-equilibrating units as small as possible, in order to minimize the region of the absorber pipe surrounded by them. In this connection, one speaks of an enlargement of the aperture area of the absorber pipe, whereby the aperture area denotes the region of the absorber pipe that is accessible in an unhindered manner to solar radiation. Together with minimizing the region that is surrounded by expansion-equilibrating units, the space that is available for arranging the getter material in the expansion-equilibrating units is also minimized. Thus, a situation may occur, in which sufficient getter material can no longer be disposed in the expansion-equilibrating units, so that the quantity of hydrogen released during operation of the absorber pipe can no longer be adsorbed to the required extent. The absorption capacity for free hydrogen is proportional to the quantity of getter material utilized. Consequently, in the case of absorber pipes with maximized aperture area, the absorption capacity of the getter material is exhausted prematurely and the efficiency of the absorber pipe decreases prematurely, so that it needs to be changed prematurely for a new absorber pipe, which negatively influences the economic balance.

Absorber pipes currently available on the market are provided with an expansion-equilibrating unit, which either extends into the annular space between the absorber pipe and the cladding pipe (DE 102 31 467 B4) or which joins the absorber pipe and the cladding pipe on the outside with one another (DE 60 223711 T2). With a temperature increase of the absorber pipe, the expansion-equilibrating unit extending into the annular space is thus compressed, whereby the aperture of the absorber pipe increases under the temperature conditions during operation.

The wall with which the annular space is sealed is composed of metal, at least in sections, so that a glass-metal connection must be provided at the end of the cladding pipe. Since metal and glass directly transition into one another in the glass-metal connection, the different length expansions due to a temperature change are particularly critical here. As a consequence of the different length expansion, damage occurs frequently at the glass-metal connection, which leads to a loss of the vacuum in the annular space. This results in a clear reduction in the efficiency of the solar collector, which then can no longer be operated economically.

The expansion-equilibrating unit extending toward the annular space screens the half of the glass-metal connection turned away from the collector from defocused, concentrated radiation. The compression of the expansion-equilibrating unit that accompanies higher temperatures can lead to the circumstance that the glass-metal connection is subjected to defocused radiation, particularly in the case of an axially shortened configuration of the expansion-equilibrating unit.

In the case of the outer-lying expansion-equilibrating unit, the latter offers no protection for the glass-metal connection. Therefore, a shield is provided elsewhere for the protection of the glass-metal connection (DE 60 223 711 T2).

The defocused radiation contributes to the heating of the glass-metal connection, but not to the heating of the thermal oil, so that it provides no contribution to the generation of electrical energy. Thus, the efficiency of the solar collector decreases with an increasing fraction of defocused radiation. Secondary mirrors, which are disposed in the annular space in the half of the absorber pipe turned away from the collector mirror in order to increase the efficiency of the solar collector, are known from U.S. Pat. No. 4,432,345 and U.S. Pat. No. 4,273,104.

The problem of the present invention is thus to at least reduce the above-discussed disadvantages of known retaining devices of the prior art and to further develop the absorber pipe so that the heating of the getter material is at least reduced and a simple manufacture and assembly of the absorber pipe is made possible, whereby the retaining device can be supplied with both getter material as well as with a container that is filled with getter material and/or protective gas, and the getter material will be arranged as desired.

In addition, the problem of the present invention is to respond to the disadvantages of known absorber pipe designs, in particular the reduction in the capacity of the getter materials for free hydrogen and the heating of the glass-metal connection due to defocused radiation and the thus accompanying loss of defocused radiation.

SUMMARY OF THE INVENTION

The problem is solved in that the retaining device is attached to the wall. No direct heat conduction occurs between the metal pipe and the retaining device. Heat conduction only occurs via additional components, to which the retaining device is attached. The longer the path of heat conduction is, the smaller the heat transfer will be, so that the heating of the getter material is reduced. The wall is thermally largely decoupled from the metal pipe, so that it is barely heated during operation of the absorber pipe. Due to the fact that the retaining device is attached to the wall, no heat or only a small amount of heat can enter into the getter material, so that this material is also not heated during operation or is heated only to a small extent.

Further, the different length expansions as a consequence of the heating of the metal pipe and the retaining device need not be considered. Since the retaining device is not attached to the metal pipe, it can expand independently from the metal pipe, without damage occurring.

The wall of the absorber pipe preferably has an outer ring, a transition element and/or a connection element, whereby the retaining device is attached to the outer ring, to the transition element or to the connection element. Outer rings, transition elements and connection elements are typical components of an expansion-equilibrating unit, with which the different expansions of the metal pipe and the cladding pipe will be equilibrated during operation of the absorber and simultaneously, the annular space will be sealed.

The wall preferably comprises an expansion bellows, the retaining device being attached to the expansion bellows. Many expansion-equilibrating units also comprise an expansion bellows that equilibrates the axial displacements as a consequence of different expansions of the metal pipe and the cladding pipe. According to the invention, it is possible to arrange the retaining device annularly around the metal pipe without needing to take additional fastening measures. In this way, the retaining device can be fixed to or suspended from the expansion bellows by fastening means. Since the expansion bellows is usually manufactured from a light-impermeable material such as metal, in this arrangement, it protects the getter material from solar radiation at least on one side, which also leads to a reduction in the heating of the getter material.

According to the invention, the retaining device has a first region and a second region and the absorber pipe has one half facing the collector mirror and one half turned away from the mirror. In this case, the getter material or a first container filled with getter material is arranged in the first region, and a second container filled with protective gas is disposed in the second region, whereby the first region is found in the half turned away from the collector mirror and the second region is found in the half facing the collector mirror.

The half turned away from the collector mirror is shaded by the metal pipe, so that the first region is not subjected to the focused solar radiation. Subsequently the getter material is not heated or is heated only slightly, for which reason its absorption capacity for free hydrogen is not reduced.

The protective gas, which is found in the second container, is not particularly temperature-sensitive. The second container is configured so that it can be opened by an external action, for example, a heating effect, so that the protective gas flows out and is distributed in the annular space. Protective gases, e.g., carbon dioxide or inert gases, have a very small heat conductivity, so that in spite of a relatively high hydrogen concentration, they reduce heat conduction through the annular space, which in turn limits the heat losses of the absorber pipe.

Preferably, the retaining device comprises a receiving section for receiving the getter material or the container, the receiving section being configured annularly, and a radiation protection shield against solar radiation and heat radiation. By means of the annular configuration, the getter material can be disposed as desired around the metal tube in the annular space of the absorber pipe. The receiving section and thus the retaining device can be designed in one piece, which facilitates assembly in the annular space. The radiation protection shield protects the getter material from solar radiation that either directly enters the absorber pipe from the sun or is reflected by the collector mirror to the absorber pipe. Further, the heat radiation, which does not emanate directly from the sun, but rather from the hot metal pipe, for example, is also prevented from heating the getter material.

In this way, the heating of the getter material and the thus-accompanying reduction in the absorption capacity of the getter material for free hydrogen are reduced. The retaining device can also have several radiation protection shields that are disposed, for example, distanced radially outward from one another, when viewed from the longitudinal axis of the absorber pipe. Each time depending on the position of the getter material in the retaining device, the first radiation protection shield sometimes takes over a variable portion of bearing the getter material, and the second radiation protection shield also sometimes takes it over. Further, a separate radiation protection shield can be provided, which is disposed inside the retaining device, when viewed radially outward from the longitudinal axis of the absorber pipe, and has no bearing function. It can be accommodated thermally decoupled on the retaining device or on the metal pipe or on the wall and repulses solar radiation before it can reach the retaining device.

The retaining device preferably comprises a highly reflecting metal and/or the retaining device has a reflecting layer for reflecting solar radiation. In this way, the radiation that strikes the reflecting layer of the retaining device cannot absorb it or absorbs it only to a very small extent, for which reason the retaining device and thus also the getter material can be heated less intensely. In addition, the reflected radiation can be conducted to the metal pipe, where it can contribute to the heating of the heat transfer medium, so that this radiation is not lost.

The retaining device preferably has a cladding for the protection of the getter material from solar radiation. The cladding can be configured, for example, as a wire mesh. In this case, it does not assume an isolating function, but reduces the amount of solar radiation penetrating the getter material, e.g., by shading it. Therefore, the cladding is at least partially constructed of light-impermeable material. In order to not make it difficult for free hydrogen to access the getter material, however, the cladding has small holes that can be laser-cut, for example.

In a preferred embodiment, the cladding comprises a reflecting section for reflecting solar radiation. Solar radiation that strikes the cladding does not heat the cladding or only heats it to a very small extent and is reflected back, for example, to the metal pipe, where it contributes to heating the heat transfer medium. The solar radiation is thus utilized more effectively.

In an advantageous enhancement of the retaining device, which has a first end and a second end, a joining element is provided for joining the first and second ends. In this enhancement, the retaining device is flexible due to the use of a first spring. The retaining device can be closed into a torus-like unit with the joining element.

The absorber pipe preferably comprises a reflector disposed in the annular space for reflecting radiation, in particular solar radiation, into the metal pipe. The reflector can be designed as a stand-alone component and can be configured so that a particularly large portion of the defocused radiation is reflected to the metal pipe. In addition, specific optical properties, for example, a specific curvature of the reflector, can be considered in order to provide a bundling of the radiation, which cannot be provided for the reflecting layer of the retaining device or can be provided only at great expense.

In an advantageous configuration, the absorber pipe comprises a metal wall running between the cladding pipe and the metal pipe, at least in sections, in order to seal the annular space, whereby the wall transitions into the cladding pipe via a glass-metal connection and the reflector or the retaining device are disposed so that they protect the glass-metal connection from radiation. The glass-metal connection is particularly sensitive to fluctuations in temperature, which can lead to a failure of the glass-metal connection. A failure is followed by a loss of the vacuum in the annular space, which causes a significant reduction in the efficiency of the solar collector. The reflector and the retaining device are disposed so that they shade the glass-metal device and thus reduce heating due to defocused radiation. This leads to a reduced load of the glass-metal connection, so that it can remain in service longer.

In addition, the problem is solved by an absorber pipe of the type named initially, which comprises a reflector disposed in the annular space for reflecting radiation, in particular solar radiation, into the metal pipe, whereby the reflector has a housing with a storage section for storing and for protecting getter material from radiation. A reflector, for example, may be composed of a plate-shaped piece of sheet metal, without having a housing. Only if the reflector is configured in such a way that it provides a section that is enclosed by a wall, at least partially, and can be closed off and in which an object, for example, the getter material, can be stored and protected, will it by definition comprise a housing, In the ideal case, the collector mirror is configured so that it reflects the total radiation, in particular, the solar radiation, onto the metal pipe, which can contribute to the heating of the heat transfer medium therein. Based on manufacturing imprecisions or on mechanical effects occurring during operation of the solar collector, such as wind and hail, however, it may happen that a part of the radiation reflected by the collector mirror misses the metal pipe and cannot contribute to heating the heat transfer medium. This part of the radiation (defocused radiation) therefore remains unutilized, which reduces the efficiency of the absorber pipe and thus the efficiency of the solar collector. According to the invention, by means of the reflector disposed in the annular space, the part of the radiation that misses the metal pipe after reflection by means of the collector mirror is reflected into the metal pipe. This part of the radiation can now contribute to heating the heat transfer medium and is not lost unutilized. Imprecisions in the manufacture of the collector mirror or disturbances occurring during operation of the solar collector, according to the invention, do not lead to a reduction in the efficiency of the absorber pipe, or at least only lead to a smaller reduction in this efficiency.

The storage section of the housing of the reflector serves for receiving the getter material, which is simultaneously protected from radiation. No other structural units are provided for the getter material, which leads to simplifying the structure and thus to a cost-effective manufacture of the absorber pipe.

In another enhancement, the absorber pipe according to the invention comprises a metal wall running between the cladding pipe and the metal pipe, at least in sections, in order to seal the annular space, whereby the wall transitions into the cladding pipe via a glass-metal connection and the reflector is disposed so that it protects the glass-metal connection from radiation. According to the invention, the reflector is disposed so that the glass-metal connection is protected from defocused radiation and is thus heated less strongly by this radiation. As mentioned previously, heating and temperature fluctuations of the glass-metal connection that are too strong are frequently the cause of its failure, which has as a consequence a loss of the vacuum in the annular space. The protection of the glass-metal connection with the arrangement of the reflector according to the invention causes the functionality and performance capacity of the solar collector to be maintained.

The reflector preferably comprises a reflecting layer introduced or installed on the housing. For example, it can be provided as a reflecting foil or film, which is introduced onto the housing. A corresponding coating of the housing is also conceivable. The reflecting layer can thus be introduced even during the manufacture of the housing; expensive fastening measures are not necessary, and further, the use of separate fastening means can be omitted. The use of a highly reflecting material is also conceivable for the housing.

In addition, the reflector comprises a polished surface. This polished surface can be a part of the housing surface. In this embodiment, additional reflecting components may also be omitted, which leads to simplifying the production of the reflector.

In an advantageous configuration of the invention, the storage section comprises one or more cavities, into which the getter material can be introduced. By this measure, the position of the getter material in the housing and thus its position in relation to the reflector can be established in a structurally simple manner. The cavity can be produced in the form of a groove or fold that is milled, punched or formed by bending. The number and size of the cavities can be adapted to the required quantity of getter material. The slipping of the getter material, in particular during the assembly of the absorber pipe or the maintenance of the solar collector can be prevented by means of these cavities.

More advantageously, the cavity can be closed off by a closure or seal. This closure can be designed as a net or grid, for example. Care should be taken that the closure limits as little as possible the accessibility of the getter material to free hydrogen found in the annular space. The closure prevents the getter material from spilling out of the cavity. The getter material is usually supplied and used in the form of pressed, cylindrical pieces, also called pills. Alternatively, the getter material may also be pressed into other shapes, so that the shape of the reflector can also be considered in the selection of the shape of the pressed getter material. Hydrides form on the getter material when free hydrogen is added, and these can cause a particulation of the pills due to an increase in volume. The particles can then spread in an uncontrolled manner in the annular space and are heated by the radiation. This leads to local temperature increases (hot spots) therein, which adversely affects the service life and the efficiency of the absorber pipe. The cladding pipe manufactured from glass is particularly damaged by the hot spots. This can be prevented by providing the closure.

In an advantageous configuration of the device according to the invention, the housing is fastened to the wall. In this configuration, it is not necessary to fasten the housing to the metal pipe or to the cladding pipe. Fastening it to the metal pipe is thus particularly a disadvantage, since it is strongly heated during operation, whereby, first of all, thermal expansions would have to be considered for the fastening, and this requires an increased expenditure for construction. As long as no corresponding equilibration units are provided for equilibrating the different lengthwise expansions, there is always the danger of buckling or tearing off of the housing when it is fastened to the metal pipe.

The wall seals the annular space relative to the environment. As already presented above, the wall is constructed of metal, at least in sections. Since metals usually have a good heating capacity, when the housing is attached to the wall, heat from the housing can be discharged to the environment over the wall. The heating of the getter material is consequently reduced.

In an advantageous enhancement of the invention, in which the wall comprises a connection element and an expansion bellows, the housing is fastened to the connection element or to the expansion bellows. Expansion bellows are typical components of an expansion-equilibrating unit, with which the different expansions of the metal pipe and the cladding pipe will be equilibrated during operation of the absorber and simultaneously, the annular space will be sealed. These bellows and the connection element are usually placed at least partially in heat-conducting contact to the environment of the absorber pipe. Consequently, they discharge at least a certain amount of heat to the environment. The discharged quantity of heat can no longer enter into the getter material and heat it.

In a preferred configuration of the absorber pipe according to the invention, in which the expansion bellows has an inner end and an outer end, the housing is fastened to the inner end. The inner end points in the direction of the annular space or is found in the annular space. As presented initially, one attempts to maximize the aperture area of the absorber pipe. The expansion bellows in this case play an important role inasmuch as they help determine the axial extent of the expansion-equilibrating units. In maximizing the aperture area, one attempts to configure the expansion bellows as short as possible. Consequently, the number of folds in the expansion bellows used is limited to the necessary minimum. By means of the fastening of the housing to the inner end of the expansion bellows according to the invention, the size or the number of folds of the expansion bellows plays no role in the accommodation of the getter material. According to the invention, it is assured independently from the axial extension of the expansion-equilibrating unit, in particular the expansion bellows, that sufficient getter material can always be disposed in the annular space, since the reflector is disposed axially inwardly of the expansion-equilibrating unit and is thus independent of the axial extension.

In a preferred configuration of the present invention, in which the wall comprises an outer ring and a connection element, the housing is attached to the outer ring or to the connection element. Outer rings are typical components of an expansion-equilibrating unit, with which the different expansions of the metal pipe and the cladding pipe will be equilibrated during operation of the absorber and simultaneously, the annular space will be sealed. These rings are usually placed at least partially in heat-conducting contact with the environment of the absorber pipe. Consequently, they discharge at least a certain amount of heat to the environment. The discharged quantity of heat can no longer heat the getter material.

In a preferred enhancement of the invention, in which the absorber pipe has one half facing the collector mirror and one half turned away from it, the reflector is disposed in the half turned away from the collector mirror. The radiation reflected from the collector mirror crosses through the half facing it and strikes the metal pipe. The metal pipe brings about a shading that is largely free of radiation in the half turned away from the collector mirror. Correspondingly, the heating up of the getter material disposed in the housing is also reduced, if it is disposed in the half that is turned away.

In the half turned away from the collector mirror, the reflector does not bring about any shading of the radiation, so that the aperture area on the principally relevant half facing the collector mirror is not reduced. In addition, the reflector can reflect defocused radiation back onto the metal pipe. With this arrangement of the reflector, the absorber pipe can be operated with an increased efficiency.

The reflector preferably comprises one or more planar reflecting sections. The reflector can be constructed in a particularly simple manner by means of the planar sections, without reducing its efficiency in a noteworthy manner. In fact, the reflector may also comprise curved sections, but on the one hand, these are more difficult to manufacture, and, on the other hand, must be incorporated more precisely, so that the reflected radiation will actually be reflected into the metal pipe. This planar design of the reflector does not require such a precise installation site.

BRIEF DESCRIPTION OF THE DRAWINGS

The invention will now be explained in detail based on preferred examples of embodiment with reference to the appended figures. Herein.

DETAILED DESCRIPTION OF THE INVENTION

Figure 1:
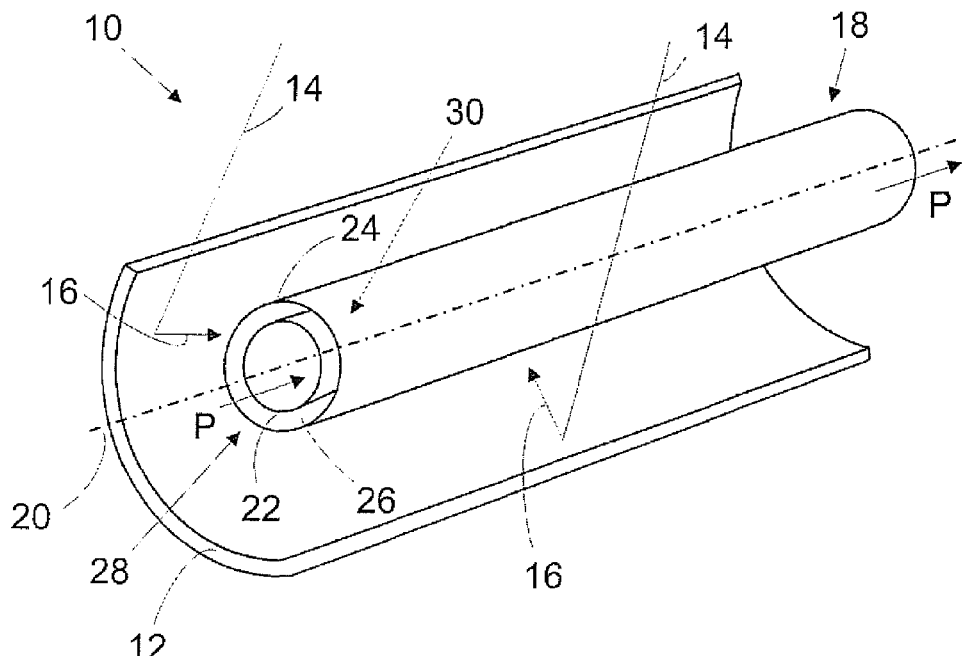
FIG. 1 shows a schematic representation of a solar collector.

A solar collector 10 of the known type is shown in FIG. 1. Solar collector 10 comprises a collector mirror 12, which reflects solar irradiation 14 and directs reflected solar irradiation 16 onto an absorber pipe 18. Collector mirror 12 is configured in trough shape, so that it brings about a focusing of the reflected solar radiation along a focal line that runs through the longitudinal axis 20 of absorber pipe 18. Absorber pipe 18 has a metal pipe 22 and a cladding pipe 24. Metal pipe 22 is coated with a radiation-absorbing layer (not shown) and a heat transfer medium flows through it. Cladding pipe 24 surrounds metal pipe 22, so that an annular space 26 is formed between metal pipe 22 and cladding pipe 24. Cladding pipe 24 is typically composed of glass. Based on the trough-shaped configuration of collector mirror 12, absorber pipe 18 can be divided into one half 28 facing collector mirror 12 and one half 30 turned away from it.

The flow direction of the heat transfer medium is indicated by arrows P. When it flows through metal pipe 22, the heat transfer medium will be heated by reflected solar radiation 16. The temperature that can be reached amounts to approximately 400° C. The heated heat transfer medium is introduced into a process that is not shown in more detail here, in which electrical energy is obtained. Half 30 of absorber pipe 18, which is turned away from collector mirror 12, is cooled by mixed convection, thus by natural convection and by forced convection due to wind, for example, which leads to heat losses and thus adversely affects the heating process of the heat transfer medium. Thus, one attempts to reduce the heat conduction from metal pipe 22 outwardly as much as possible, this conduction being effected by means of the annular space 26 formed with cladding pipe 24. The space can either be evacuated or filled with a protective gas. A combination of the two measures is also possible. Both measures cause a reduction in the heat conduction through annular space 26, whereby heat losses are limited.

Figure 2:
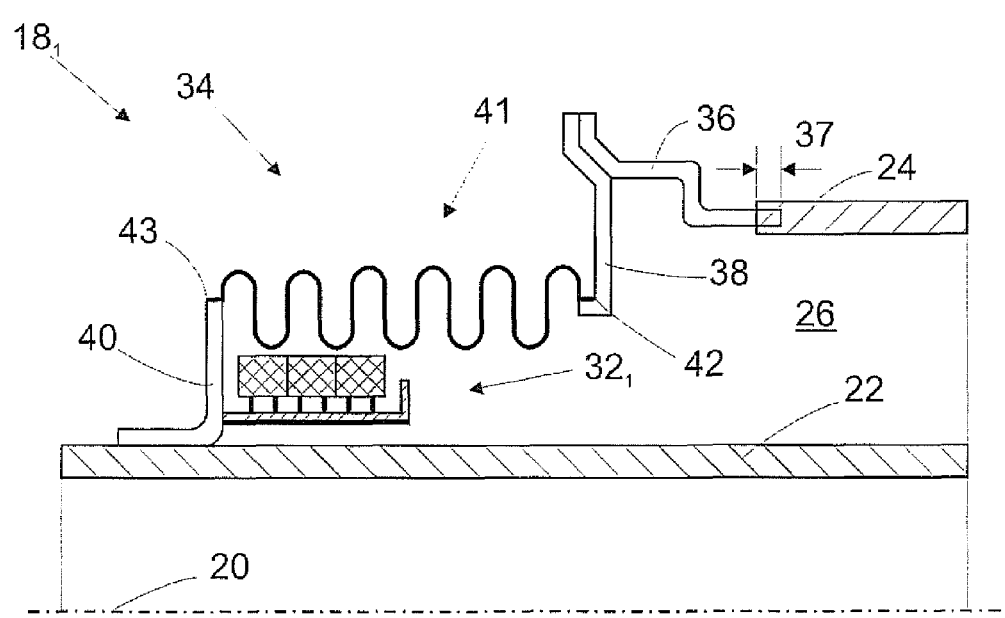
FIG. 2 shows a half-section through a first example of embodiment of an absorber pipe having a first example of embodiment of a retaining device according to the invention.

FIG. 2 shows a first absorber pipe 18 having a first example of embodiment of a retaining device $32_1$ according to the invention, in a half-sectional view. Annular space 26, in the direction of longitudinal axis 20, is sealed by a wall 34 that comprises a transition element 36 fastened to cladding pipe 24, an outer ring 38 and a connection element 40, in the example of embodiment shown. A glass-metal connection 37 is provided at the transition of transition element 36 into cladding pipe 24. In order to equilibrate the axial displacements of cladding pipe 24 relative to metal pipe 22, which are caused by the different expansions during the operation of absorber pipe 18, an expansion bellows 41, which is correspondingly compressed or expanded, is disposed between outer ring 38 and connection element 40. Outer ring 38 may also be applied onto connection element 40, it being axially displaceable, of course, on connection element 40, so that it can transfer the expansions onto expansion bellows 41. Expansion bellows 41 has an inner end 42 pointing toward annular space 26 and an outer end 43 pointing away from annular space 26. In this example of embodiment, connection element 40 is connected to outer end 43, and outer ring 38 is connected to inner end 42 of expansion bellows 41.

Retaining device $32_1$ is fastened to connection element 40 proceeding radially from longitudinal axis 20 inside expansion bellows 41 in this example, but can also be attached to transition element 36 or to outer ring 38. Expansion bellows 41 is usually manufactured from light-impermeable material such as metal. The arrangement of retaining device $32_1$ thus utilizes the shading effect of expansion bellows 41, so that retaining device $32_1$ is protected from solar radiation at least on one side, which reduces heating. In each case, retaining device $32_1$ is disposed in annular space 26 without the existence of a direct contact to metal pipe 22. Thus heat cannot be transported conductively in a direct way from metal pipe 22 into retaining device $32_1$, so that the heating of retaining device $32_1$ will also be reduced thereby.

Figure 3:
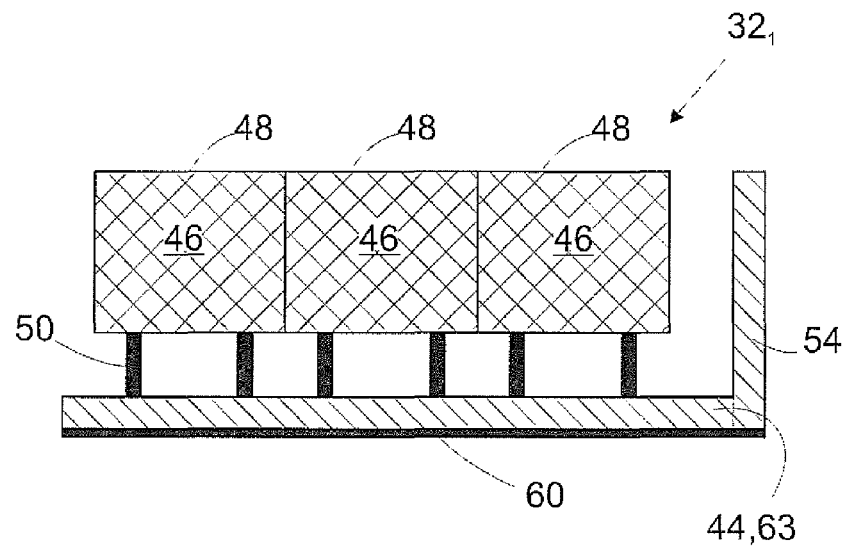
FIG. 3 shows a sectional view of the first example of embodiment of the retaining device according to the invention shown in FIG. 2, in enlarged form.

The example of embodiment of retaining device $32_1$, which is shown in FIG. 2, is isolated from absorber pipe 18 and shown enlarged in FIG. 3. In this example of embodiment, retaining device $32_1$ has a receiving section 44, which can receive a getter material 46 or a container 48 filled with getter material 46. Getter material 46 in powder form can be filled into container 48. Alternatively, getter material 46 can be pressed into portions, usually of cylindrical shape. In this case, container 48 can be omitted.

Both the getter material 46 pressed into portions as well as container 48 can be placed on spacer elements 50. These spacer elements 50 serve for the purpose of preventing heat conduction to getter material 46. Receiving section 44 has a boundary section 54, which prevents getter material 46 or container 48 filled with getter material from slipping under receiving section 44.

In this embodiment, retaining device $32_1$ is closed and configured annularly, so that it can completely enclose the metal pipe. In this case, another receiving section 44 can be provided outside receiving section 44, when viewed radially, and this can then prevent getter material 46 from falling out (not shown).

In addition, retaining device 32, as shown in FIG. 2, is fastened to connection element 40. In turn, the latter is in contact with metal pipe 22 and surrounds it in a gas-tight manner, for which special seals are provided, which are not shown here. The seals are usually composed of a poorly heat-conducting material, so that connection element 40 is largely thermally decoupled from metal pipe 22. In order to reduce heat conduction as much as possible, however, one attempts to keep the contact surface between receiving section 44 and connection element 40 as small as possible. This can be done, for example, by joining retaining device $32_1$ pointwise to connection element 40. It is thus achieved that only a small heat conduction can result from connection element 40 to getter material 46 or to container 48 filled with getter material 46.

Further, retaining device $32_1$ comprises a reflecting layer 60, which points toward metal pipe 22 and is fastened to receiving section 44. Reflecting layer 60 deflects solar rays that have missed or just brushed against metal pipe 22 and fall onto reflecting layer 60, back to metal pipe 22. In this way, it is prevented, on the one hand, that retaining device $32_1$ absorbs solar rays, which could lead to a heating of getter material 46, and, on the other hand, the reflected rays in metal pipe 22 can contribute to the heating of the heat transfer medium. Alternatively, receiving section 44 can be formed wholly or partially as a highly reflecting metal 60.

Figure 4:
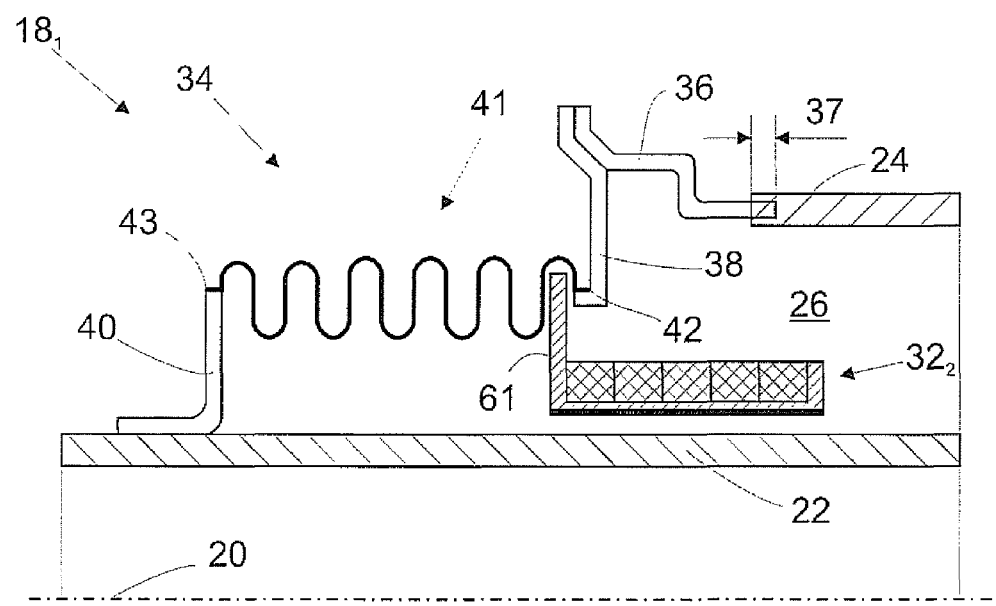
FIG. 4 shows a half-section through the absorber pipe according to the first example of embodiment having a retaining device according to a second example of embodiment.

A second example of embodiment of a retaining device $32_2$ is shown in FIG. 4. It largely corresponds to the first example of embodiment of retaining device $32_1$, but, of course, here it is not attached to connection element 40, but rather is attached to the expansion bellows with fastening means 61. These fastening means 61 may be configured as a part of receiving section 44. Fastening means 61, for example, can be introduced into a fold of expansion bellows 41. This then offers a constructively simple solution, if retaining device $32_2$ surrounds metal pipe 22 by 180° or more. In addition, retaining device $32_2$ according to the second embodiment is designed longer than retaining device $32_1$ according to the first embodiment. In all, five containers 48 can be received by retaining device $32_2$. In addition, with the lengthened version, it is possible to shade glass-metal connection 37 and thus to protect it from heating.

Since retaining device $32_2$ is not placed in contact with connection element 40, heat cannot conductively enter into retaining device $32_2$ from connection element 40 and thus to getter material 46. Here, it is also valid that retaining device $32_2$ is not placed in direct contact with metal pipe 22, so that heat cannot be transported conductively from metal pipe 22 directly into retaining device $32_2$. The lengthwise expansion of metal pipe 22 does not influence retaining device $32_2$.

Figure 5:
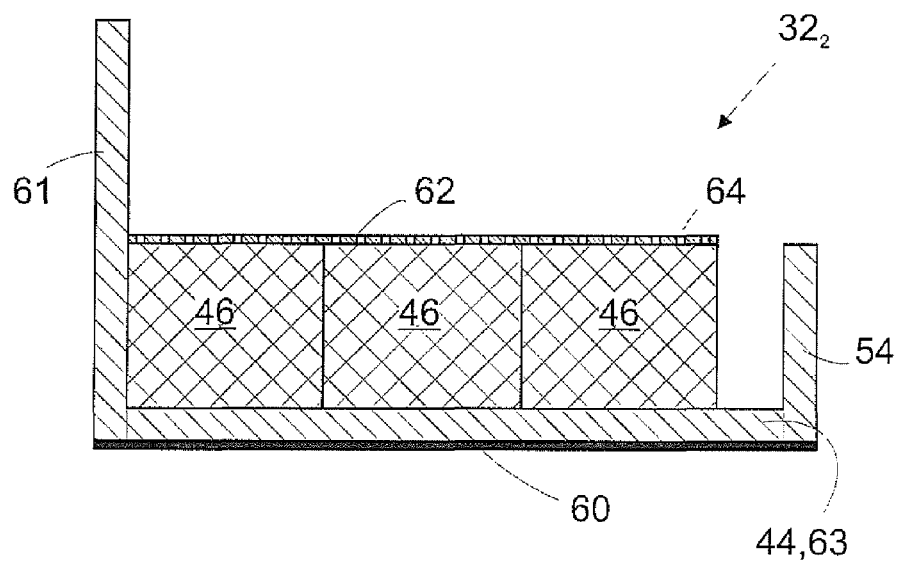
FIG. 5 shows a sectional view of the second example of embodiment of the retaining device according to the invention shown in FIG. 4, in enlarged form.

Retaining device $32_2$ is shown enlarged in FIG. 5. One sees that getter material 46 is surrounded by a cladding 62, which holds getter material 46 in retaining device $32_2$. This cladding 62 can be formed as a metal mesh or a cloth sock. In order to assure that free hydrogen has access to getter material 46, cladding 62 has perforations 64.

Figure 6:
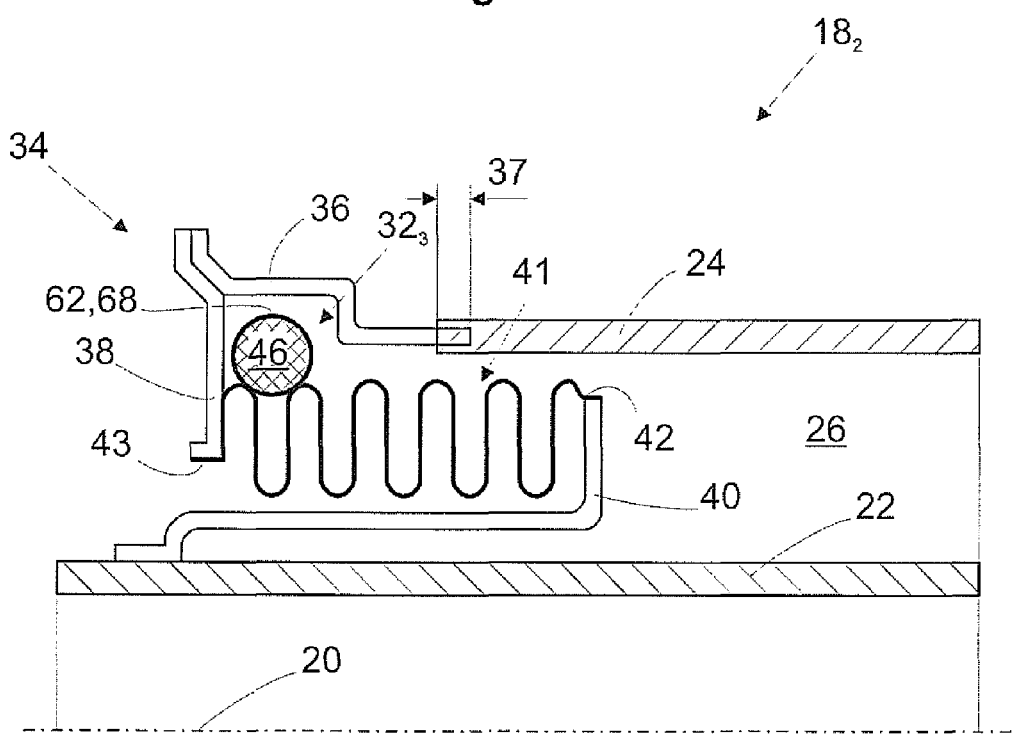
FIG. 6 shows a half-section through the second embodiment of the absorber pipe having a third example of embodiment of the retaining device according to the invention.

A second absorber pipe 18 having a third example of embodiment of retaining device $32_3$ according to the invention is shown in FIG. 6. Of course, here retaining device $32_3$ is wrapped around expansion bellows 41. For this purpose, in contrast to the example shown in FIG. 2, connection element 40 is connected to the inner end, and outer ring 38 is connected to the outer end of expansion bellows 41. The axial extent of wall 34 is reduced thereby, so that a larger section of metal pipe 22 can be subjected to solar radiation, which increases the efficiency of absorber pipe 18. In addition, glass-metal connection 37 is shaded by connection element 40 and by expansion bellows 41 and is protected from defocused radiation.

Figure 7:
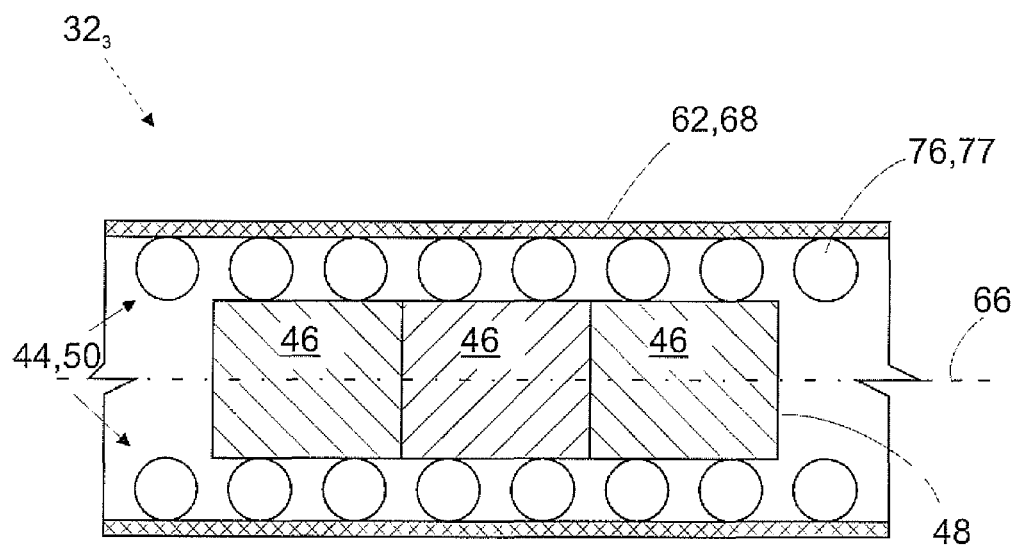
FIG. 7 shows a partial sectional view of the third example of embodiment of the retaining device according to the invention shown in FIG. 6, along the longitudinal axis, in enlarged form.
Figure 8:
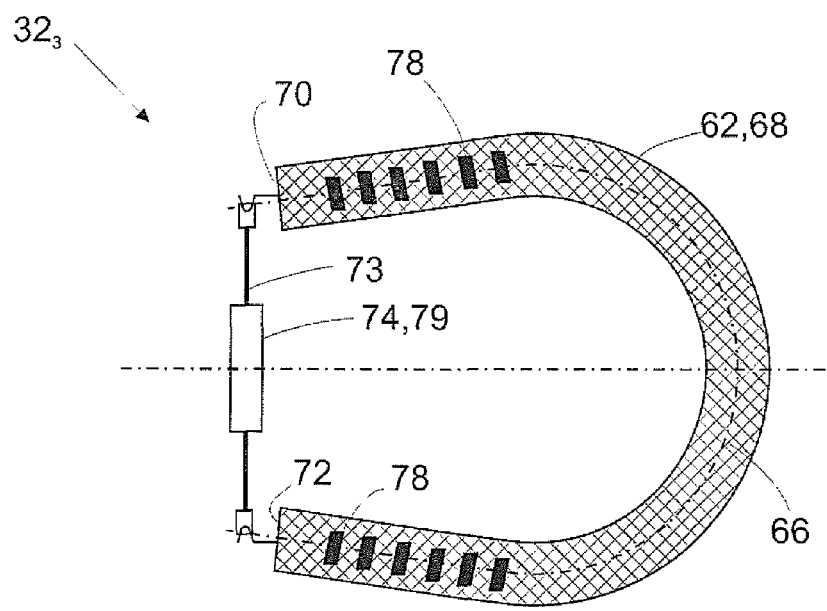
FIG. 8 shows a top view onto the third example of embodiment of the retaining device according to the invention shown in FIGS. 6 and 7.

The third example of embodiment of retaining device $32_3$ is shown in FIG. 7 in a partial sectional view along a longitudinal axis 66 (see FIG. 8). Receiving section 44 and fastening means 50 are combined here and configured as a first spring 76 with windings 77. Container 48 or getter material 46 is disposed in the space enclosed by windings 77 and is held in place by these windings. Longitudinal axis 66 of retaining device $32_3$ can be bent by using first spring 76.

Cladding 62 in this example of embodiment is designed as a wire mesh 68, which is pulled over first spring 76. Wire mesh 68 protects getter material 46 by shading it against solar rays, but simultaneously guarantees that free hydrogen can easily reach getter material 46. Wire mesh 68 does not reduce heat conduction to getter material 46.

FIG. 8 shows a top view of the third example of embodiment of retaining device $32_3$ according to the invention. Retaining device $32_3$ has a first end 70 and a second end 72, which are joined to a connection element 73, so that first spring 76 is bent. Connection element 73 has a prestressing element 74, which exercises a prestressing force when it is extended. Prestressing element 74 is designed here as a third spring 79. The length of retaining device $32_3$ or of connection element 73 in this case is selected so that the first and second ends 70, 72 are pulled apart from one another during assembly, for example when it is fitted around expansion bellows 41, as is shown in FIG. 6, so that prestressing element 74 is extended and generates a prestressing force. A part of this prestressing force produces a frictional force between retaining device $32_3$ and expansion bellows 41, so that retaining device $32_3$ is established in its position. Reflecting sections 78, which reflect solar rays and reduce the heating of getter material 46, are disposed on wire mesh 68.

Figure 9:
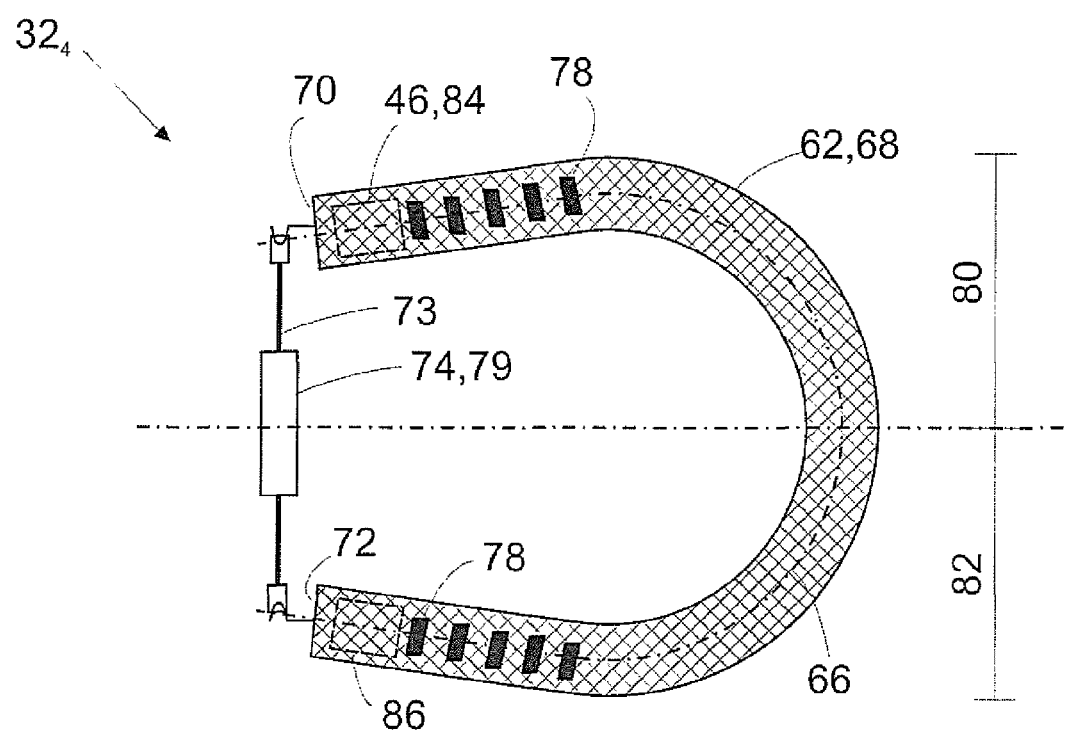
FIG. 9 shows a top view onto a fourth example of embodiment of the retaining device according to the invention.

A fourth example of embodiment of a retaining device $32_4$ according to the invention is shown in FIG. 9. It is essentially constructed as the example of embodiment shown in FIGS. 7 and 8. Here, retaining device $32_4$ is divided into a first region 80 and into a second region 82. Getter material 46 or one or more first containers 84 filled with getter material 46 are found in first region 80, while one or more second containers 86 filled with protective gas are disposed in second region 82.

Figure 10:
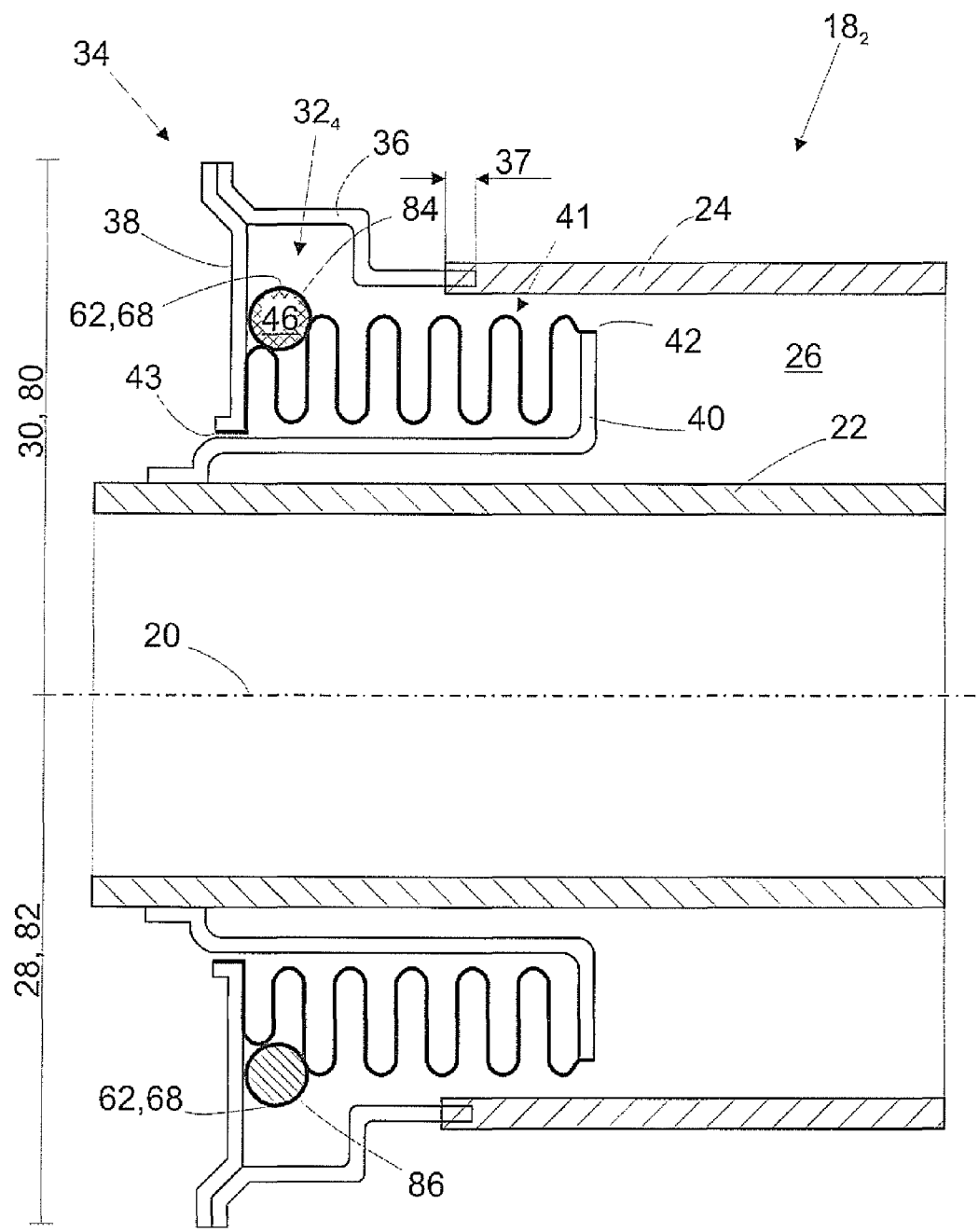
FIG. 10 shows a sectional view through the second example of embodiment of the absorber pipe having the fourth example of embodiment of the retaining device according to the invention.

An absorber pipe 18 having a fourth example of embodiment of retaining device $32_4$ according to the invention is shown in FIG. 10. Retaining device $32_4$ is disposed so that first region 80 is found in the half 30 turned away from collector mirror 12 and second region 82 is found in the half 28 of absorber pipe 18 facing collector mirror 12. Concentrated solar radiation coming from collector mirror 12 does not strike half 30 which is turned away. Consequently, the getter material 46 according to the invention found in the turned-away half 30 is not heated by solar radiation, so that its absorption capacity for free hydrogen is not reduced. In this way, for example, the arrangement of second container 86 in the half 82 facing collector mirror 12 is not to be construed that it must be completely disposed in half 82. It can also be disposed at least partially in the turned-away half 80.

Figure 11:
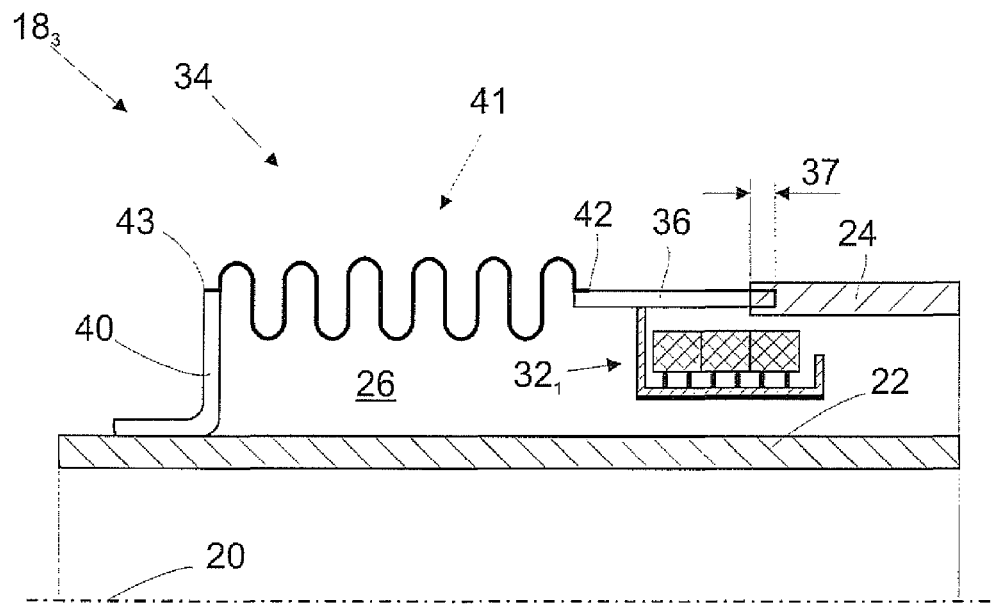
FIG. 11 shows a half-section through a third example of embodiment of the absorber pipe having the first example of embodiment of the retaining device according to the invention.

Absorber pipe $18_3$ according to a third embodiment, which largely corresponds to absorber pipe $18_1$ shown in FIG. 2 and has a retaining device $32_1$ according to the first example of embodiment, is shown in FIG. 11. Here, wall 34 is constructed somewhat differently. In this example of embodiment, wall 34 has no outer ring 38. Rather, expansion bellows 41 is directly joined with transition element 36. Cladding pipe 24 and expansion bellows 41 are dimensioned such that transition element 36 has a constant diameter. Retaining device $32_1$ is disposed so that it shades glass-metal connection 37.

Figure 12:
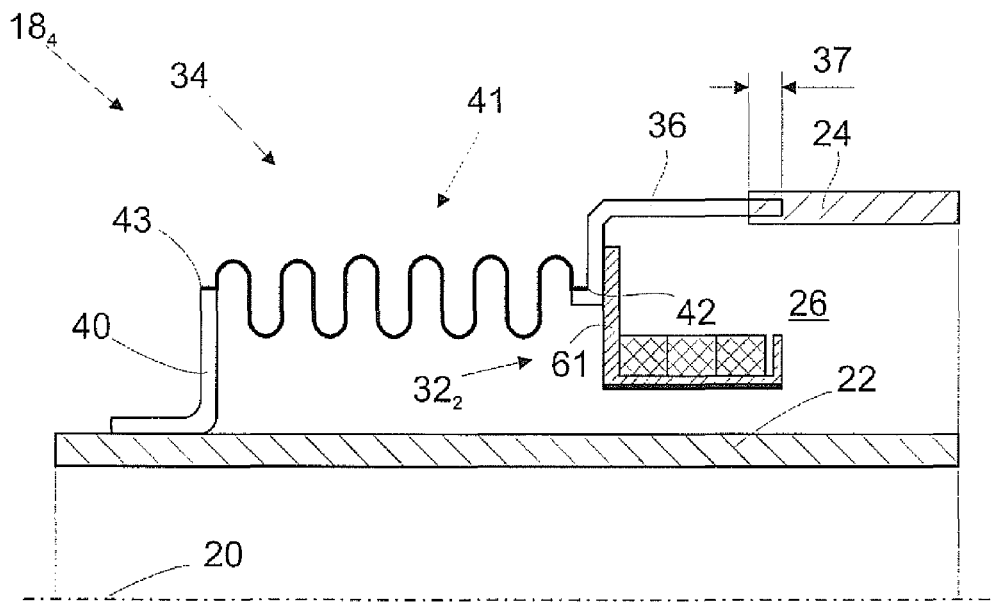
FIG. 12 shows a half-section through a fourth example of embodiment of the absorber pipe having the second example of embodiment of the retaining device according to the invention.

Absorber pipe $18_4$, which largely corresponds to absorber pipe $18_2$ shown in FIG. 4 and has a retaining device $32_2$ according to the second example of embodiment, is shown in FIG. 12. Here also, however, wall 34 is constructed somewhat differently. Here, expansion bellows 41 is joined directly with cladding pipe 24 via transition element 36, without disposing an outer ring in between. In contrast to the example of embodiment shown in FIG. 11, the diameter of transition element 36 changes, so that the diameter of cladding pipe 24 and expansion bellows 41 need not be adapted to one another, since diameter differences can be equilibrated with transition element 36.

Figure 13:
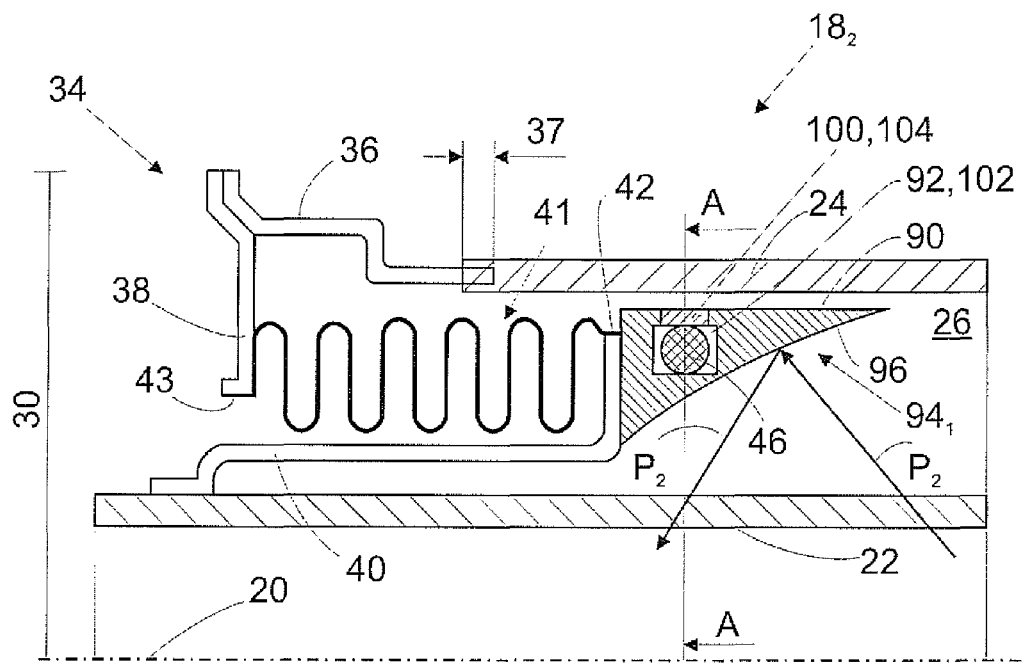
FIG. 13 shows a half-section through the second embodiment of the absorber pipe having a first example of embodiment of a reflector according to the invention.

Absorber pipe $18_2$ according to the second example of embodiment is shown in FIG. 13 in a half-sectional view. A reflector $94_1$ with a housing 90 is fastened to the inner end 42 of expansion bellows 41 and to connection element 40 in the example shown. Reflector $94_1$ reflects the reflected radiation 16 striking it from collector mirror 12 (see FIG. 14) to metal pipe 22. Reflector $94_1$ comprises a reflecting layer 96 applied on housing 90. Reflector $94_1$ is concavely curved. The reflection of radiation 16 through reflector $94_1$ is indicated by arrows $P_2$.

Housing 90 has a storage section 92, into which getter material 46 can be introduced. Storage section 92 comprises a cavity 102 and an opening 100, through which getter material 46 can be introduced into cavity 102. Opening 100 of cavity 102 is closed off with a closure 104, which can be formed as a grid, for example.

Figure 14:
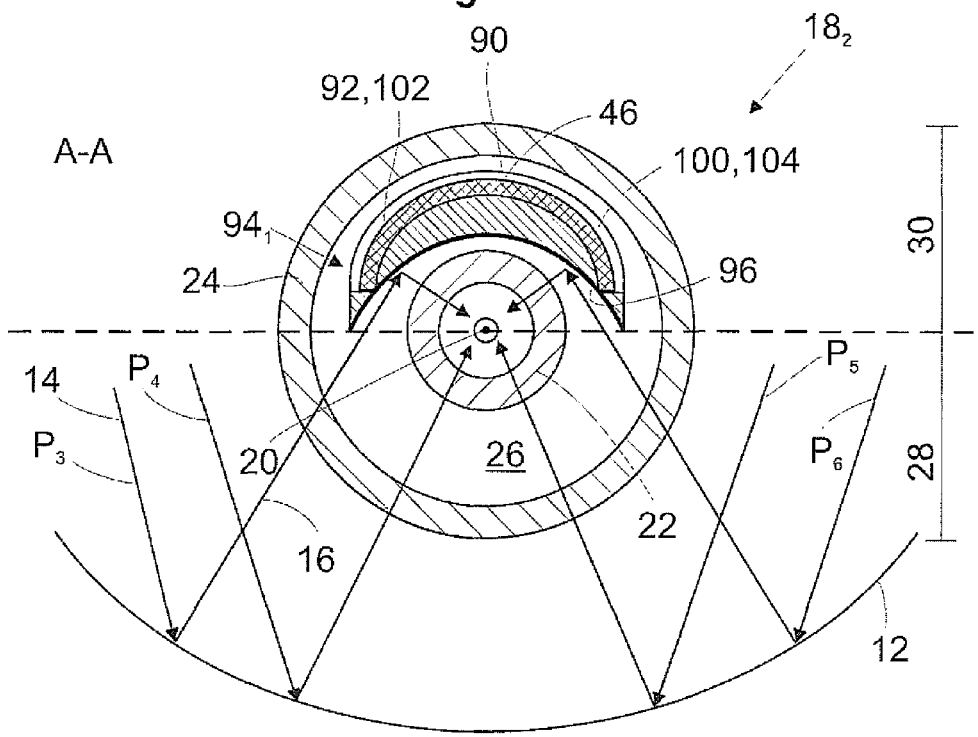
FIG. 14 shows a not-to-scale sectional view through another example of embodiment of the absorber pipe, which is largely identical to the example of embodiment shown in FIG. 13, except for the dimensions, along the sectional plane A-A defined in FIG. 13, including the collector mirror, for illustration of the beam path.

The second example of embodiment of absorber pipe $18_2$ is shown in FIG. 14 based on a sectional view along sectional plane A-A defined in FIG. 13—but not to scale. In addition, collector mirror 12 is shown. Concavely curved reflector $94_1$ can be well seen, wherein the curvature can run elliptically or parabolically or otherwise, and the curvature of 102 filled with getter material 46 can also run similarly. In addition, opening 100 can be seen, through which getter material 46 can be introduced into cavity 102. Housing 90 with reflector 94₁ and getter material 46 are exclusively disposed in half 30 of absorber pipe 18₂ turned away from collector mirror 12. Half 28 facing collector mirror 12 and half 30 of absorber pipe 18₂ turned away from it are well recognizable.

Arrows $P_3$ to $P_6$ are drawn to illustrate the beam paths of solar rays 14. The rays that run along arrows $P_4$ and $P_5$ strike collector mirror 12 and are reflected from it directly into metal pipe 22, where they contribute to heating the heat transfer medium. The rays that run along arrows $P_3$ and $P_6$ also strike collector mirror 12. These are not reflected into metal pipe 22 from collector mirror 12, but rather miss it (defocused radiation), for example, as a consequence of manufacturing imprecisions of collector mirror 12. Normally, these would pass through cladding pipe 24 on half 30 turned away from collector mirror 12 and could not contribute to heating the heat transfer medium.

According to the invention, however, these rays strike reflector 94₁, which is configured so that it reflects the rays back into metal pipe 22, so that they can contribute to heating the heat transfer medium and do not remain unutilized. Reflector 94₁ and getter material 46 are thus positioned with respect to one another so that getter material 46 cannot be heated by the defocused radiation. According to the invention, on the one hand, it is achieved that rays that miss metal pipe 22 are reflected back through reflector 94₁ into metal pipe 22 and thus do not remain unutilized, and, on the other hand, that getter material 46 is not heated by these rays, which would reduce its absorption capacity for free hydrogen.

Figure 15:
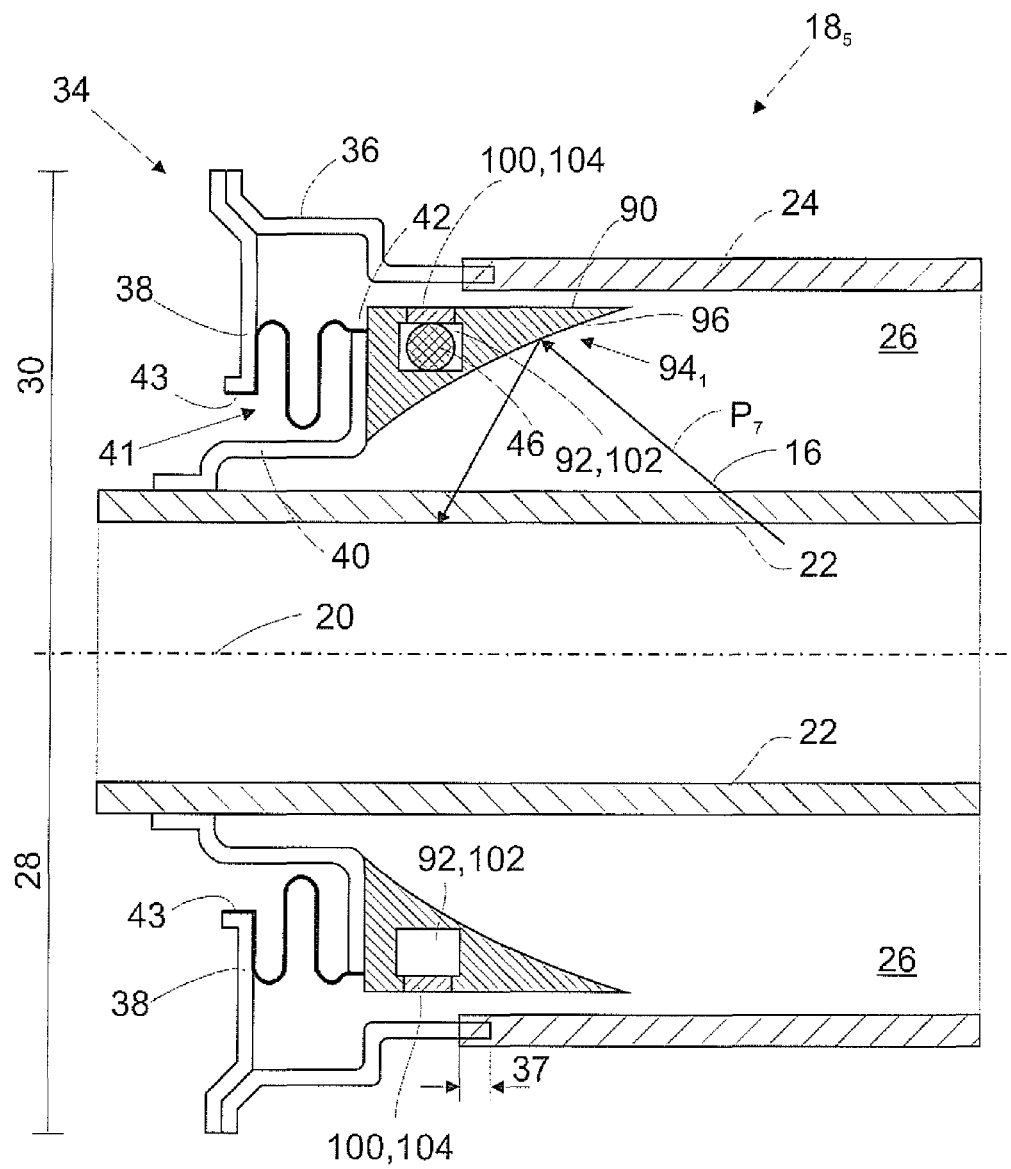
FIG. 15 shows a sectional view through an absorber pipe having the first example of embodiment of the reflector according to the invention.

A fifth example of embodiment of an absorber pipe 18₅ according to the invention is shown in FIG. 15. In contrast to the first example of embodiment, here housing 90 and reflector 94₁ surround metal pipe 22 completely; thus they pass through both halves 28, 30 of absorber pipe 18₅, the half facing collector mirror 12 and the half turned away from the mirror. Getter material 46, of course, is disposed only in half 30 of absorber pipe 18₅ that is turned away from the mirror. Further, in this example of embodiment, the number of folds of expansion bellows 41 is reduced to the absolutely required minimum. According to the invention, the arrangement of getter material 46 is independent of the axial expansion of expansion bellows 41, so that sufficient getter material 46 can always be accommodated in housing 90.

Transition element 36 forms glass-metal connection 37 at its transition into cladding pipe 24. In the dimensioning of housing 90 and its arrangement inside annular space 26, taking into consideration the axial extension of expansion bellows 41, in this example of embodiment, care is to be taken that glass-metal connection 37 is shaded as much as possible. Glass-metal connection 37 is sensitive to thermal expansions for which reason a shading increases the reliability of glass-metal connection 37.

The reflection of radiation 16 through reflector 94₁ is indicated by arrow $P_7$.

Figure 16:
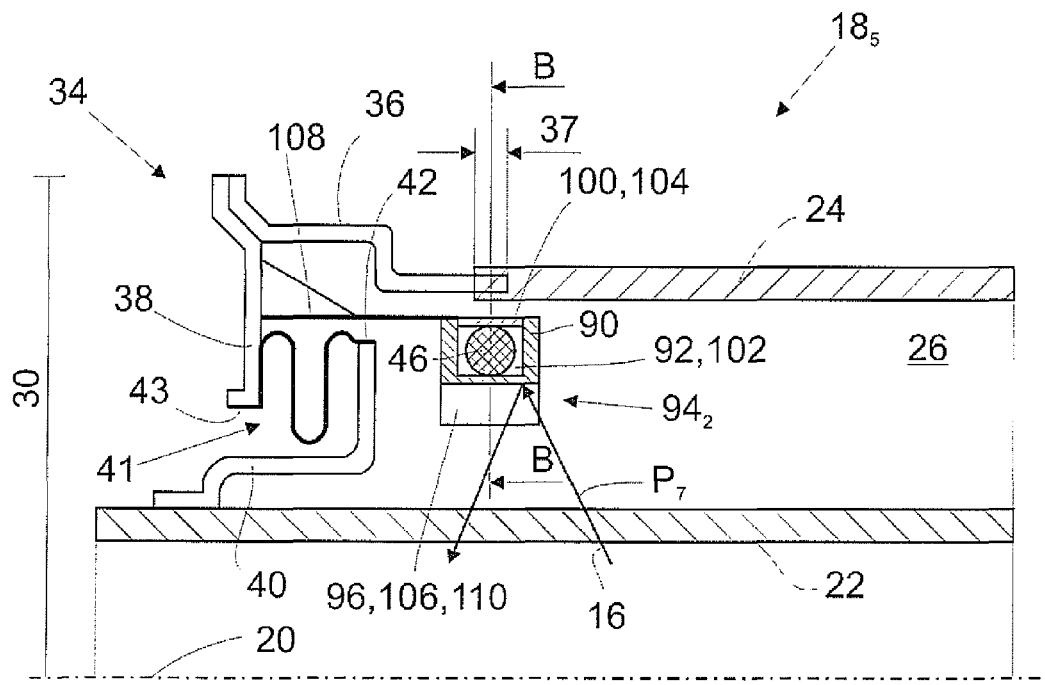
FIG. 16 shows a half-section through an absorber pipe having a second example of embodiment of the reflector according to the invention.

The absorber pipe shown in FIG. 16 has a second example of embodiment of reflector 94₂, which is constructed from several planar sections 106. Planar sections 106 can be designed as reflecting layer 96 of housing 90 or as separate components. Reflecting layer 96 can be designed as a polished surface 110, which is also reflecting. Reflector 94 is fastened to a bracket 108, which extends from outer ring 38 to reflector 94 without touching expansion bellows 41. Reflector 94 is disposed so that it shades glass-metal connection 37. Defocused radiation 16, whose course is indicated by arrow $P_7$, is prevented from striking glass-metal connection 37 by means of reflector 94. In addition, reflector 94 provides for the defocused radiation to be again deflected back to metal pipe 22 and to contribute to heating the thermal oil.

Storage section 92, in which getter material 46 is found, is disposed in housing 90 of reflector 94₂. Storage section 92 in turn is designed as cavity 102, which can be closed off with closure 104.

Figure 17:
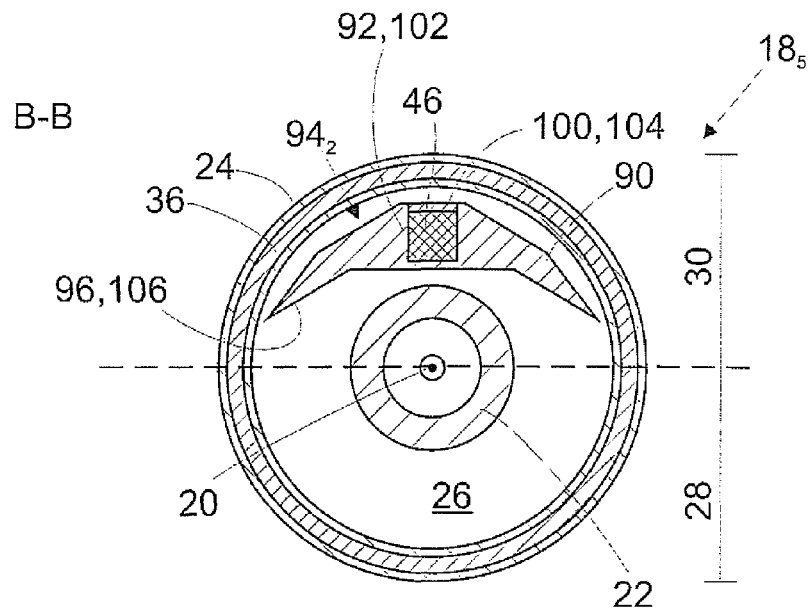
FIG. 17 shows a not-to-scale sectional view through another example of embodiment of the absorber pipe, which is largely identical to the example of embodiment shown in FIG. 16, except for the dimensions, along the sectional plane B-B defined in FIG. 16.

Absorber pipe 18₅, which largely corresponds to the one in FIG. 16 except for the dimensions, is shown in FIG. 17. Absorber pipe 18₅ is shown based on sectional plane B-B defined in FIG. 16. It can be seen that reflector 94₂ is disposed in half 30 of absorber pipe 18 turned away from collector mirror 12.

LIST OF REFERENCE CHARACTERS

10 Solar collector
12 Collector mirror
14 Solar irradiation
16 Reflected solar irradiation
18₁-18₆ Absorber pipe
20 Longitudinal axis of the absorber pipe
22 Metal pipe
24 Cladding pipe
26 Annular space
28 Half of the absorber pipe facing the collector mirror
30 Half of the absorber pipe turned away from the collector mirror
32₁-32₄ Retaining device
34 Wall
36 Transition element
37 Glass-metal connection
38 Outer ring
40 Connection element
41 Expansion bellows
42 Inner end
43 Outer end
44 Receiving section
46 Getter material
48 Container
50 Spacer element
54 Boundary section
60 Reflecting layer
61 Fastening means
62 Cladding
63 Radiation protection shield
64 Perforations
66 Longitudinal axis of the retaining device
68 Wire mesh
70 First end
72 Second end
73 Connection element
74 Prestressing element
76 First spring
77 Windings
78 Reflecting section
79 Third spring
80 First region
82 Second region
84 First container
86 Second container
90 Housing
92 Storage section
94 Reflector
96 Reflecting layer
100 Opening 102 Cavity
104 Closure
106 Planar section
108 Bracket
110 Polished surface
P Flow direction of heat transfer medium

The invention claimed is:

1. An absorber pipe for solar collectors in solar-thermal power plants having at least one collector mirror, the absorber pipe comprising:
   a metal pipe for conducting and heating a heat transfer medium;
   a cladding pipe surrounding the metal pipe to form an annular space;
   a wall running between the cladding pipe and the metal pipe, the wall sealing the annular space, wherein the wall comprises an outer ring, a transition element, an expansion bellows, and a connection element; and
   a retaining device disposed in the annular space at least partially between the expansion bellows and the metal pipe, and having a receiving section configured to receive a getter material of a container filled with getter material, wherein the retaining device is fastened to one of the outer ring, the transition element, the expansion bellows, and the connection element.

2. The absorber pipe according to claim 1, wherein the retaining device has a first region and a second region, wherein the getter material or the container filled with the getter material is disposed in the first region, a second container filled with protective gas is disposed in the second region, and wherein the first region is turned away from the at least one collector mirror and the second region is facing the at least one collector mirror.

3. The absorber pipe according to claim 1, wherein the retaining device comprises a reflecting metal or a reflecting layer for reflecting solar radiation.

4. The absorber pipe according to claim 1, wherein the retaining device comprises a cladding for protecting the getter material from solar radiation.

5. The absorber pipe according to claim 4, wherein the cladding is wire mesh.

6. The absorber pipe according to claim 4, wherein the cladding comprises a reflecting section for reflecting solar radiation.

7. The absorber pipe according to claim 4, wherein the retaining device has a first end and a second end connected to one another by a connection element.

8. The absorber pipe according to claim 1, further comprising a reflector disposed in the annular space, wherein the reflector is configured to reflect solar radiation into the metal pipe.

9. The absorber pipe according to claim 8, wherein the wall transitions into the cladding pipe via a glass-metal connection, and wherein the reflector or the retaining device is disposed so that it protects the glass-metal connection from radiation.

10. The absorber pipe according to claim 1, wherein the retaining device is fastened to the expansion bellows.

11. The absorber pipe according to claim 1, wherein the retaining device is fastened to the transition element.

12. An absorber pipe for solar collectors in solar-thermal power plants having at least one collector mirror, the absorber pipe comprising:
    a metal pipe for conducting and heating a heat transfer medium;
    a cladding pipe surrounding the metal pipe to form an annular space;
    a getter material disposed in the annular space for binding free hydrogen present in the annular space;
    a reflector disposed in the annular space for reflecting solar radiation into the metal pipe, wherein the reflector has a housing with a storage section for fastening and for protecting getter material from the solar radiation;
    a wall running between the cladding pipe and the metal pipe, the wall sealing the annular space, wherein the wall comprises an outer ring, a transition element, an expansion bellows, and a connection element; and
    a retaining device disposed in the annular space at least partially between the expansion bellows and the metal pipe, and having a receiving section configured to receive a getter material or a container filled with getter material, wherein the retaining device is fastened to one of the outer ring, the transition element, the expansion bellows, and the connection element.

13. The absorber pipe according to claim 12 further comprising a metal wall that extends between the cladding pipe and the metal pipe, at least in sections, in order to seal the annular space, wherein the metal wall transitions into the cladding pipe via a glass-metal connection, and wherein the reflector is disposed so that it protects the glass-metal connection from the solar radiation.

14. The absorber pipe according to claim 13, wherein the housing is fastened to the metal wall.

15. The absorber pipe according to claim 14, wherein the housing is fastened to the connection element or to the expansion bellows.

16. The absorber pipe according to claim 12, further comprising getter material disposed in a portion that is turned away from the collector mirror.

17. The absorber pipe according to claim 13, wherein the metal wall comprises an outer ring and a transition element, and wherein the housing is fastened to the outer ring or to the transition element.

18. The absorber pipe according to claim 12, wherein the reflector comprises a reflecting layer on the housing.

19. The absorber pipe according to claim 12, wherein the reflector comprises a polished surface.

20. The absorber pipe according to claim 12, wherein the storage section comprises one or more cavities into which getter material can be introduced.

21. The absorber pipe according to claim 20, wherein the one or more cavities can be closed off by a closure.

22. The absorber pipe according to claim 15, wherein the expansion bellows has an inner end and an outer end and the housing is fastened to the inner end.

23. The absorber pipe according to claim 16, wherein the reflector is disposed in the portion that is turned away from the collector mirror.

24. The absorber pipe according to claim 12, wherein the reflector comprises one or more planar reflecting sections.

25. The absorber pipe according to claim 12, wherein the housing is fastened to the connection element.

26. The absorber pipe according to claim 12, wherein the housing is fastened to the expansion bellows.

* * * * *